INVENTOR
R. L. MILLER
BY
John K. Mullarney
ATTORNEY

INVENTOR
R. L. MILLER
BY John K. Mullarney
ATTORNEY

INVENTOR
R. L. MILLER
BY
John K. Mullarney
ATTORNEY

INVENTOR
R. L. MILLER
BY John K. Mullarney
ATTORNEY

United States Patent Office 3,175,212
Patented Mar. 23, 1965

3,175,212
NONLINEAR PCM ENCODERS
Ralph L. Miller, Chatham, N.J., assignor to Bell Telephone Laboratories, Incorporated, New York, N.Y., a corporation of New York
Filed Sept. 25, 1961, Ser. No. 140,282
12 Claims. (Cl. 340—348)

Figure 1:
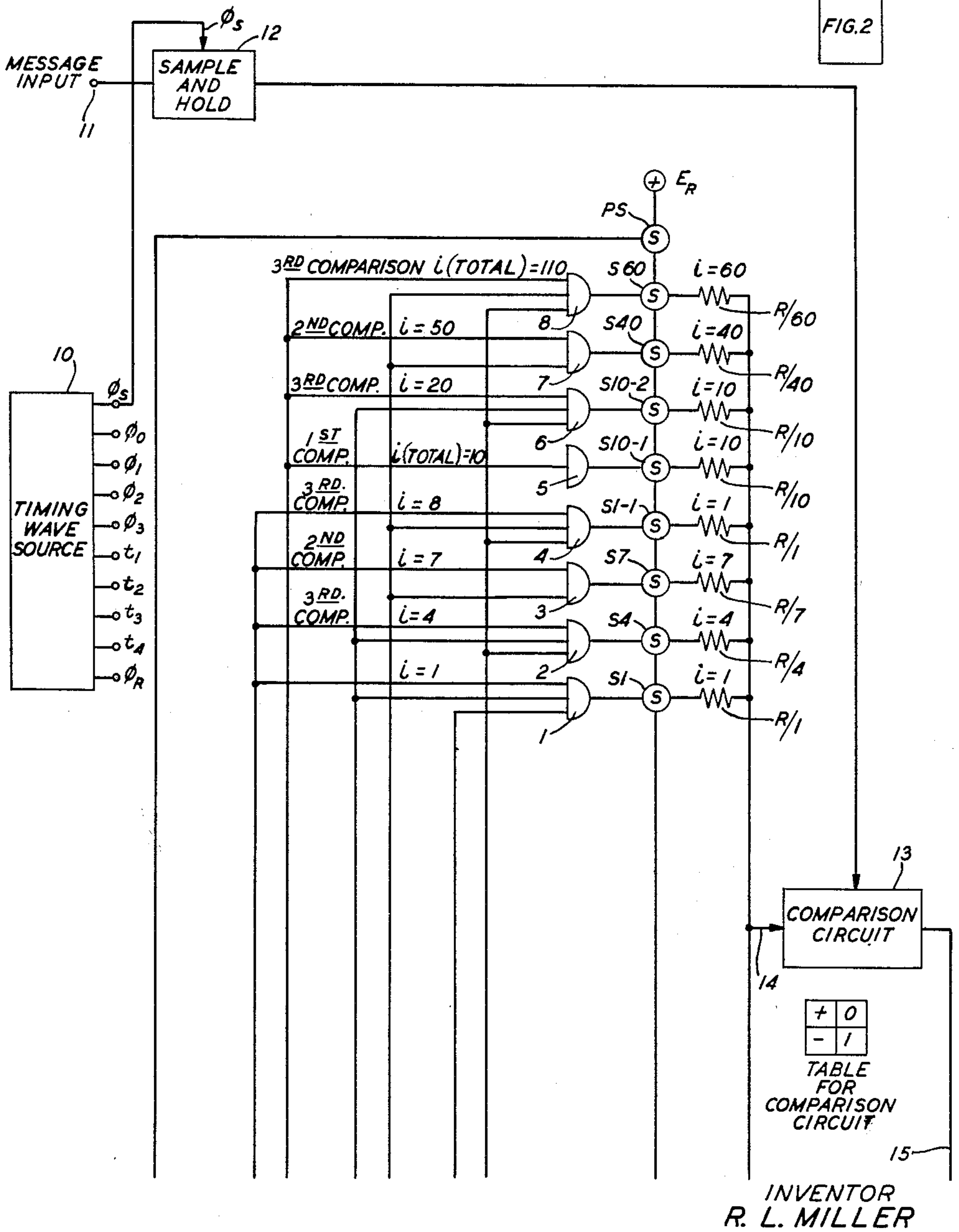

This invention relates to transmission by pulse code modulation (PCM) and, more particularly, to nonlinear PCM encoders that combine the operations of volume range compression and encoding.

Prior to the transmission of a message signal by pulse code modulation, it is first quantized. In the quantizing process, the exact value of the signal at any instant of time is approximated by one of a number of discrete values called quantum levels. Unfortunately, the difference between the exact value of a signal and the quantum level which is encoded to represent it, results in distortion. This distortion is commonly referred to as "quantizing noise." A figure of merit in systems employing quantization is the signal-to-quantizing-noise ratio; the larger this ratio, the better.

The distortion resulting from quantization is particularly objectionable and often intolerable when the instantaneous value of the message signal is small, but is usually of little significance when the instantaneous value is large. To ameliorate the undesirable relationship between low-valued message samples and the attendant quantizing noise, it has been common practice in the art to attempt to distribute the quantum levels so that the average signal-to-quantizing-noise ratio will be kept at a maximum. This distribution, which incidentally results in a nonlinear encoding characteristic, is usually such that more quantum levels are allocated to the low-valued samples of the message signal. The low-valued samples are accordingly more accurately defined as they are translated into a representative code. Since the dynamic range of the message signal is thus effectively compressed, the low-valued samples are emphasized, i.e., effectively increased in amplitude, while the high-valued samples are de-emphasized. In any case, an ideal allocation of the available quantum levels or, in other words, an ideal encoding characteristic, will depend upon the statistical amplitude distribution of the message signal.

It is a primary object of the present invention to provide an optimum encoding characteristic for a message signal of any given statistical amplitude distribution.

B. D. Smith describes a basic feedback encoder in his paper entitled, "Coding by Feedback Methods," which appears in Volume 41 of The Proceedings of the I.R.E., August 1953, pages 1053–1058. He compares the merits and shortcomings of the feedback method (in general, the method of operation of the present invention) with those of other encoding methods. He also discloses a method of nonlinear encoding in which a reference network is used to produce a hyperbolic encoding characteristic. He concludes at page 1058 with the prediction that other reference networks producing mathematically defined compression characteristics "other than sections of hyperbolas should be possible but have not been found."

Numerous circuit configurations of varying degrees of complexity have been proposed heretofore for achieving hyperbolic and logarithmic encoding characteristics or approximations thereto. The aforementioned Smith article discloses a circuit arrangement for achieving a hyperbolic encoding characteristic, the patent to L. A. Meacham, 2,592,308, issued April 8, 1952, discloses a logarithmic encoding characteristic, and the application of C. P. Villars, Serial No. 813,776, filed May 18, 1959, now U.S. Patent No. 3,016,528, discloses a piecewiselinear encoding characteristic. In the latter case, a given nonlinear compression characteristic, over a specified range, is approximated by several successive linear subranges. In the application of C. P. Villars, Serial No. 853,921, filed November 18, 1959, now U.S. Patent No. 3,065,422, a plurality of cascaded resistance networks and interposed amplifiers are used to achieve certain specified nonlinear encoding characteristics.

It is a further object of the present invention to achieve a nonlinear encoding characteristic of any given configuration.

A related object is to provide an improved yet simplified PCM encoder having an arbitrary compression scale.

Still another object is to provide a PCM encoder with a significantly improved signal-to-quantizing-noise ratio.

Briefly, in accordance with the present invention, that part of the PCM encoder which generates reference signals for comparison with the message input comprises a reference generating resistance network which utilizes a plurality of resistance branches equal in number to the number of decision levels desired. Accordingly, with a resistance branch per level, the resistance of each branch can be appropriately weighted to provide any given compression characteristic.

Heretofore, it has been the usual practice in feed-back or network type encoders to utilize a limited number of binary weighted resistances, the number being related, in an exponential manner, to the number of desired quanta. For example, for 128 quantum levels, seven weighted resistances are switched in and out of the reference signal path in a known, conventional manner; for example, see the article entitled "A Remote Line Concentrator for a Time-Separation Switching Experiment" by D. B. James and J. D. Johannesen, Bell System Technical Journal, Volume 39, January 1960, pages 46–49. However, with this commonly utilized prior art arrangement, volume compression is not realized and so various schemes have been devised to control the current and/or voltage signals delivered to the switched resistance branches (see Carbrey Patent 2,889,409, issued June 2, 1959).

In the present invention, wherein the number of resistance branches equals the number of desired levels, any arbitrary compression scale can be realized simply by selecting appropriate resistance values for each of said branches. The branches are logically switched in and out of the reference signal path in accordance with the outcome of the next previous message-reference comparison. The resistance branches when "switched in" are connected to a constant current voltage source and no induced variation in the same or in the signal current delivered thereto is necessary or desired.

A particularly advantageous feature of the invention resides in the fact that any given compression scale can be arrived at through the appropriate selection of passive elements.

The feedback encoder of the present invention can further be advantageously utilized in a differential PCM encoder arrangement. And in addition to all of the advantages commonly associated with differential PCM, increased stability and a substantially improved signal-to-quantizing-noise are thereby realized, as will be described hereinafter.

Figure 3:
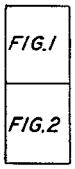
Figure 2:
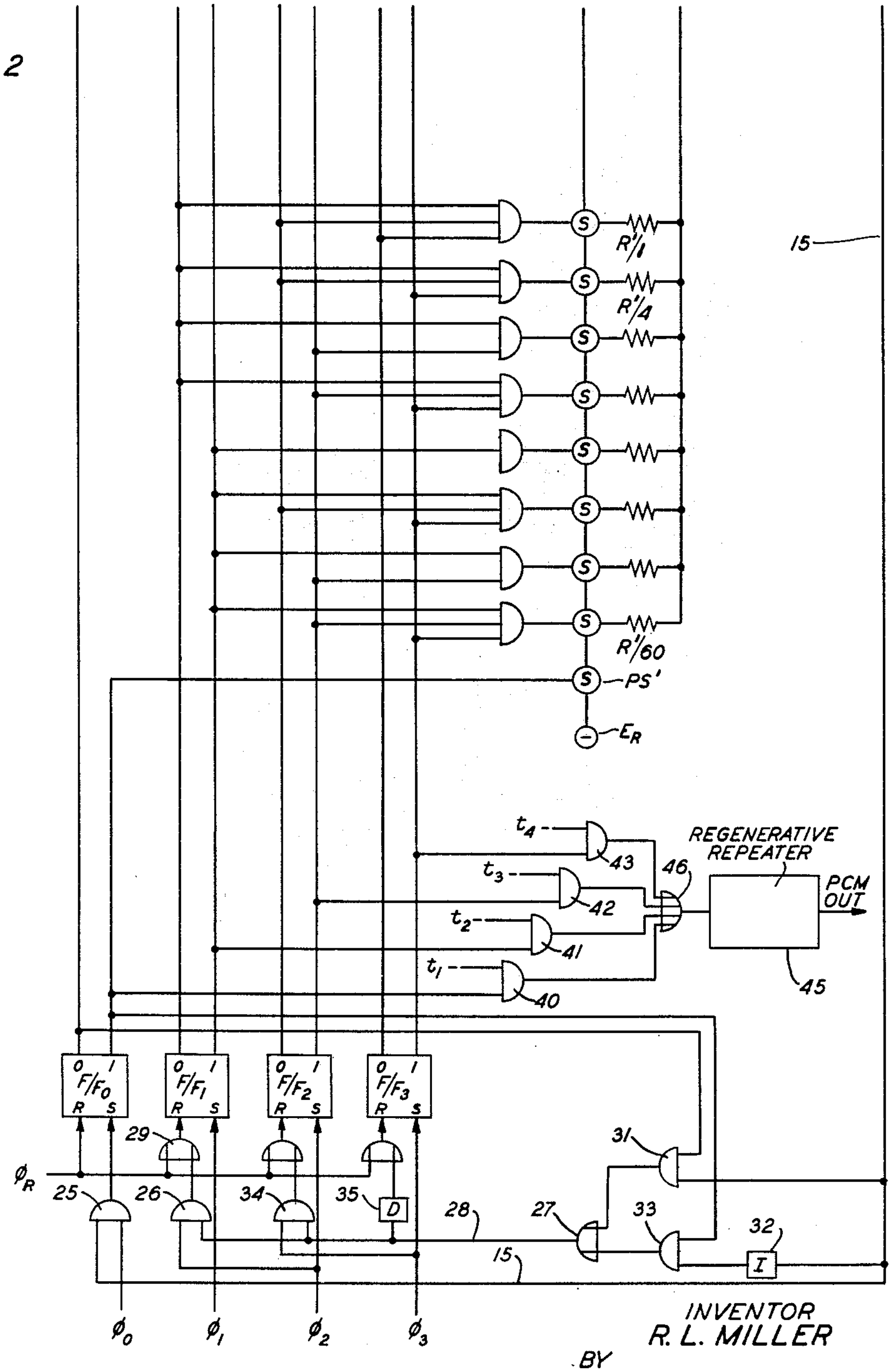
Figure 4:
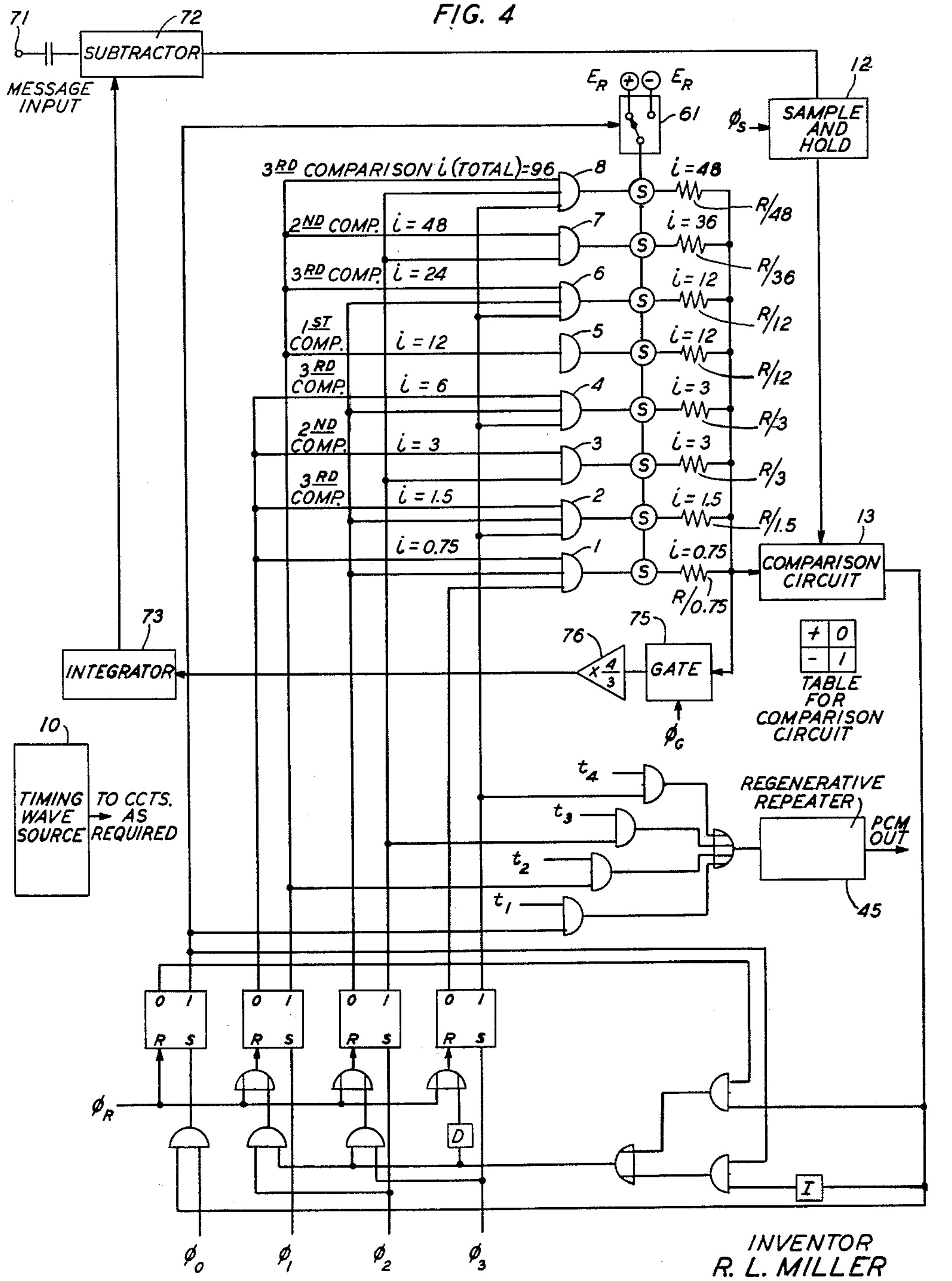
Figure 5:
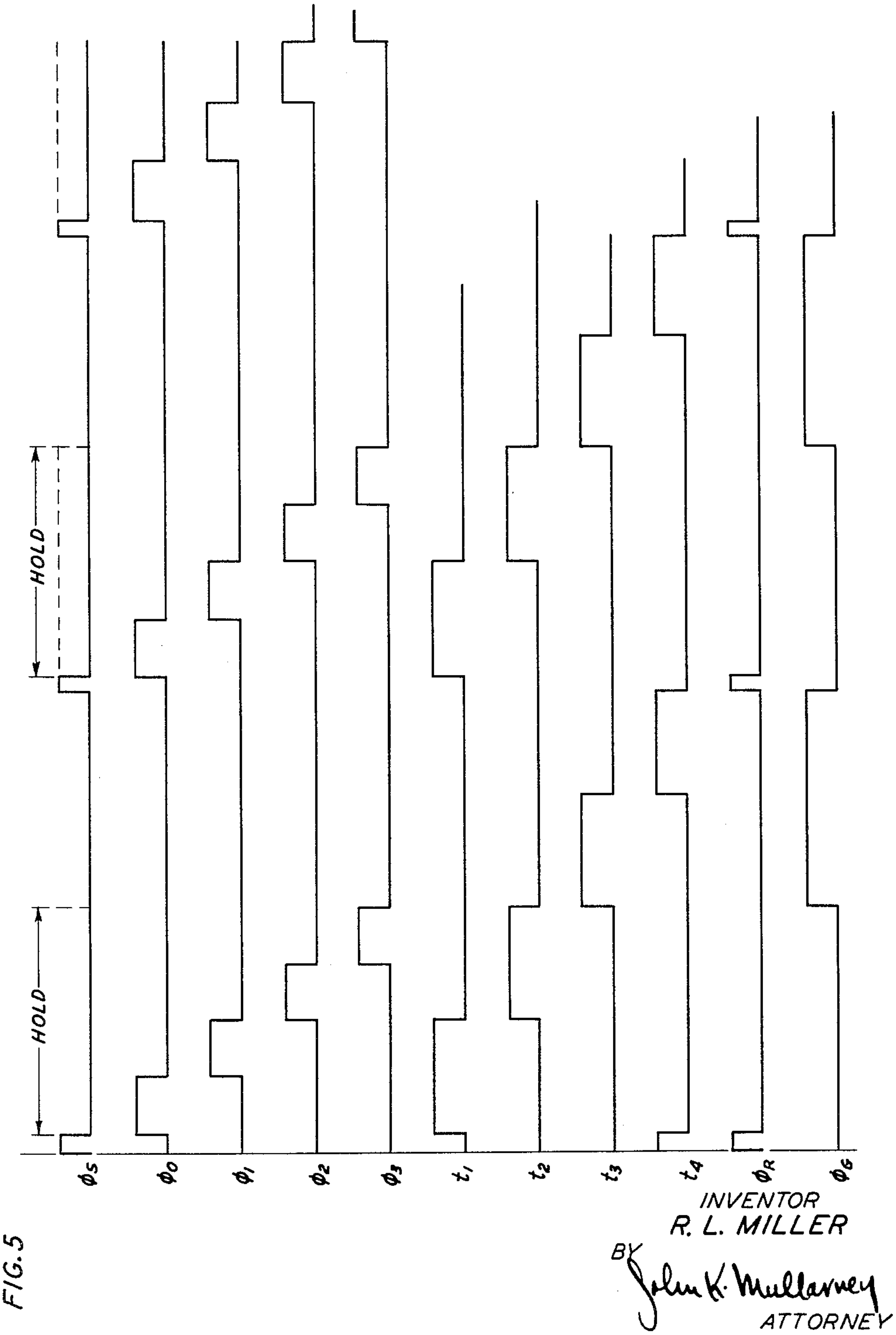

Other objects and advantages of the invention will become apparent by reference to the following description when considered in connection with the accompanying drawings, wherein:

FIGS. 1 and 2, when combined as shown in FIG. 3, show a schematic circuit diagram of a nonlinear, feedback type, PCM encoder in accordance with the present invention;

FIG. 4 is a schematic circuit diagram of a nonlinear differential PCM encoder in accordance with the invention; and FIG. 5 is a timing diagram illustrating the various timing operations involved in the above schematic circuits.

For the sake of brevity and simplicity the present disclosure will concern the application of the principles of the invention to the encoding process only. This expedient is believed justified, since it is well known that principles applicable to encoding are equally applicable in a straight-forward manner to the reverse process of decoding. Also, for ease of narration and understanding, the schematic diagram illustrated in FIGS. 1 and 2 has been simplified in that it converts analog information to only a four digit code. It should be understood, however, that in the practice of the invention the code may consist of any number of desired digits.

In the description of the illustrative schematic circuit diagram of FIGS. 1 and 2, reference will be made at appropriate times to the timing diagram of FIG. 5 as an aid in understanding the principles of operation of the invention. In FIGS. 1 and 2 a message signal current is applied to the input terminal 11 and thence to the sample and hold circuit 12. The message signal is sampled at periodic intervals under the control of the sampling signal $\varphi_s$, and the analog equivalent of the sample amplitude is retained, for example, as a capacitive charge, for the period designated "Hold" in FIG. 5.

The sampling signal $\varphi_s$ is derived from the timing wave source 10, as are the other waveforms illustrated in FIG. 5. A sample and hold circuit and a timing source constitute common components of PCM encoders, and hence numerous circuits are known to those in the art for carrying out these respective functions.

The output of the sample and hold circuit 12 is delivered to the comparison or difference circuit 13 which subtracts from the message signal current the reference current supplied over lead 14 [i.e. (sample) minus (reference) current]. The manner in which the reference current is generated will be thoroughly explored hereinafter.

The comparison circuit is likewise a common component of all network or feedback type encoders. Such comparison circuits in general comprise a difference amplifier and a decision circuit (for example, a Schmitt flip-flop) coupled to the output thereof. The state of the flip-flop is determined by the polarity of the input supplied thereto from the difference amplifier. The function of the comparison circuit 13 is tabulated in the table which appears adjacent thereto in FIG. 1. If the difference between the two signal inputs is a value of positive polarity (+), a zero voltage output (0) is provided by the circuit 13; whereas if said difference is a value of negative polarity (—), an energizing potential of a given value (1) is derived therefrom.

The output of the comparison circuit 13 is delivered via lead 15 to the input of AND gate 25 along with the timing signal $\varphi_0$ derived from timing source 10. As shown in FIG. 5, the signal $\varphi_0$ is generated after each and every sample ($\varphi_s$). The output of AND gate 25 is delivered to the "set" terminal of the flip-flop FF0.

The flip-flops FF0 to FF3 are of the conventional bistable Eccles-Jordan type. Each of the flip-flops is arranged in a manner known in the art to supply "two rail logic output signals." In other words, each flip-flop has a (0) and a (1) output lead. When a flip-flop is set to its "1" state, by an energizing signal delivered to its "set" terminal, it will apply an energizing signal over its (1) output lead. Alternatively, of course, in its "0" state an energizing signal appears over its (0) output lead.

The output lead 15 of comparison circuit 13 is also coupled to the "reset" terminals of FF1, FF2 and FF3 via logic circuitry which comprises a plurality of AND gates, OR gates, and an inverter. The flip-flops FF1, FF2 and FF3 are set to their "1" state by the respective timing signals $\varphi_1$, $\varphi_2$, and $\varphi_3$, and they are respectively reset, or not, in accordance with the results of the next previous message-reference comparison. The aforementioned logic circuitry partakes in this flip-flop reset operation in a manner which will be described in detail hereinafter.

The (0) and (1) output leads of flip-flops FF1, FF2 and FF3 extend to form a translation circuit, as mentioned heretofore. The AND gates 1 through 8 are interconnected to these output rail leads in the illustrated manner. Thus, for example, if the flip-flops FF1 and FF2 are set to their "1" state to thereby deliver energizing signals over their (1) output leads, the AND gate 7 will be energized to deliver an actuating signal to its associated switch designated S40. The switches in FIG. 1 designated S1, S4, S7, et cetera, are connected to a constant voltage source $E_R$ via polarity switch PS. This latter switch is connected to the (0) output lead of flip-flop FF0 and hence will be actuated or closed when this flip-flop is in its "0" or "reset" state. The switches S1 through S60 when actuated serve to interconnect respective resistance branches to the constant voltage source, the switch PS, of course, being necessarily in an actuated or closed condition. There are numerous electronic and logic circuits known to those in the art which are capable of carrying out the described switching functions. For example, the switches S1 through S60 may comprise AND gates with the lead from the source $E_R$ constituting one of the inputs to each.

As respective switches are actuated current will flow from the source $E_R$ through one or more resistance branches and thence to the comparison circuit via lead 14. The current flowing through one or more resistance branches constitutes the reference current which is subtracted from the message signal current, in the manner described hereinbefore. As stated previously, the total number of resistance branches utilized in the disclosed encoder arrangement is equal to the number of desired decision levels. The resistance values need not be related as the powers of two, as has been the case heretofore, and they can assume various values, related or otherwise, to achieve any type of arbitrary compression characteristic. In the instant case the resistances are of the designated values, that is, R/1, R/4, R/7, et cetera, and since the current flow in each branch is the reciprocal of the resistance thereof, the current in the respective branches will be of the designated values. Thus, a current of 1.0 unit flows in resistance R/1 when switch S1 closes, a current of 4.0 units will flow in resistance R/4 when S4 is actuated, a current of 7.0 units appears in resistance R/7 upon the closure of switch S7, and so on. It should be clear at this point that the successive decision levels that result from this array of resistances does not follow any known compression scale, that is, it is neither linear, nor hyperbolic, nor logarithmic. However, the latter and other different compression scales can be readily arrived at by appropriate selection of the resistance values for each branch.

For a clearer understanding of the encoder illustrated in FIGS. 1 and 2, a detailed explanation of the operation of the same will now be given. In the explanation which follows, reference will frequently be made to the timing diagram of FIG. 5. The explanation will, it is believed, be much more meaningful if a representative numerical amplitude of the sampled message current is assumed. Hence, it will be assumed that the sampled message current is equal to +70.0 units of analog current amplitude.

At the same time that the first sample is taken, the flip-flops FF0 through FF3 are "reset" by the application of a reset pulse $\varphi_R$ to their respective "reset" terminals (see FIG. 5 for timing of same). The +70.0 units of analog current is delivered to the input of the comparison circuit to initially set the same to its zero voltage output state (0). As will be recalled, this output of comparison circuit 13 is connected to the input of AND gate 25 along with the timing pulse signal $\varphi_0$. When the timing signal $\varphi_0$ appears subsequent to the first sample (see FIG. 5) the same will not be passed by AND gate 25 since the other input lead thereto, lead 15, is not energized. Thus the flip-flop FF0 remains in its "0" or "reset" stage. With flip-flop FF0 in its "0" state an energizing signal appears over its (0) output rail lead, and since the polarity switch PS is connected to this rail lead the same is actuated or closed. The state of flip-flop FF0 is thus indicative of the polarity of the incoming message signal, and it remains in this state for the duration of the message-reference comparison.

The circuit remains in this condition until the occurrence of the next timing signal $\varphi_1$. The latter signal is delivered directly to the "set" terminal of flip-flop FF1 to set the same to its "1" or "set" state. With this flip-flop so set, the first message-reference amplitude comparison takes place.

In its "1" state the flip-flop FF1 delivers an energizing signal over its (1) output lead to the single input AND gate 5 so as to energize the same. This results in the closure of switch S10–1 which in turn connects the constant voltage source $+E_R$ to the associated resistance branch R/10, and a current of 10.0 units is thus delivered to the lead 14. This reference current is subtracted from the +70.0 units of analog message current, but inasmuch as the difference therebetween is still a positive voltage the output from the comparison circuit remains as before.

The timing signal $\varphi_2$ appears subsequent to the termination of signal $\varphi_1$ and it is coupled directly to the "set" terminal of flip-flop FF2 and also to the input of AND gate 26. The other input to AND gate 26 is derived from the OR gate 27 via lead 28. Thus if the lead 28 were energized, the timing signal $\varphi_2$ would also be coupled to the "reset" terminal of flip-flop FF1 via AND gate 26 and OR gate 29.

The AND gate 31 is connected to the presently energized rail lead (0) of flip-flop FF0, but inasmuch as there is no energizing potential on lead 15 no signal is passed by AND gate 31. The condition or state of lead 15 is inverted, in conventional fashion, in the inverter 32 to thereby deliver an energizing potential to AND gate 33. The other input to this AND gate is derived from the (1) output rail lead of flip-flop FF0, but since this rail lead is temporarily de-energized, no signal is passed by AND gate 33. Accordingly, flip-flop FF1 remains in its "1" state and flip-flop FF2 is likewise set to its "1" state. With these flip-flops so set the second message-reference comparison occurs.

The AND gate 7 is connected to the (1) output leads of flip-flops FF1 and FF2 and hence it will deliver an actuating signal to the switch S40. The latter switch connects the voltage source $+E_R$ to resistance branch R/40, and a current of 40.0 units is thus delivered via this branch to the lead 14. Since the switch S10–1 remains actuated a current of 10.0 units is also delivered over its associated resistance branch to the lead 14. Thus, as indicated on the drawing by the symbol ($i$=50), for the second comparison a total reference current of 50.0 units is delivered to the lead 14. This reference current is subtracted from the +70.0 units of analog message current, but inasmuch as the difference therebetween is still a positive voltage the output from the comparison circuit remains as before.

The timing signal $\varphi_3$ appears subsequent to the termination of signal $\varphi_2$ and it is coupled directly to the "set" terminal of flip-flop FF3 and also to the input of AND gate 34. The other input to AND gate 34 is derived from the OR gate 27 via lead 28. Thus, if the lead 28 were energized, the timing signal $\varphi_3$ would be coupled to the "reset" terminal of flip-flop FF2 via AND gate 34. However, for the same reasons as set forth above, one of the input leads to each of the AND gates 31 and 32 is de-energized and hence no energizing signal appears on lead 28, and flip-flop FF2 remains in its "1" state. Thus, at the beginning of the third comparison the flip-flops FF1, FF2 and FF3 are all set to their "1" state.

The AND gate 8 is connected to the energized (1) output rail leads of flip-flops FF1, FF2 and FF3 and hence it will deliver an actuating signal to the switch S60. The latter switch connects the voltage source $+E_R$ to resistance branch R/60, and a current of 60.0 units is thus delivered via this branch to the lead 14. Since the switches S10–1 and S40 remain actuated, currents of 10.0 units and 40.0 units are also delivered over the respective branches R/10 and R/40 to the lead 14. Thus, for this third comparison a total reference current of 110.0 units is delivered to the lead 14. When this reference current is subtracted from the analog message [for example (+70)−(+110)] a negative difference signal results and thus, as indicated in the table, an energizing potential (1) is delivered to the lead 15.

The lead 15 is coupled to the input of AND gate 31, the other input to this gate being the energizing potential derived from the (0) output lead of flip-flop FF0. Accordingly, an energizing signal is delivered by the energized AND gate 31, to the "reset" terminal of flip-flop FF3 via OR gate 27, lead 28, and delay 35. The short time delay 35 merely serves to prevent the resetting of flip-flop FF3 by transient signals and further it allows an adequate time for comparison prior to the resetting of the flip-flop. The timing signal $\varphi_3$ is preferably of sufficiently short duration so as to have terminated prior to the appearance of this latter energizing signal on lead 28. Otherwise, a short time delay must be inserted between the lead 28 and AND gate 34 to prevent the resetting of flip-flop FF2.

The end result of the above-described operation is that the flip-flops FF0, FF1 and FF2 are set to their "1" state, while flip-flop FF3 is returned to its "0" state. Had the sampled message current been of a value exceeding +110.0 units, flip-flop FF3 would also have been set to its "1" state, and would have remained "set." The state of the flip-flops is indicative of the fact that the sampled message current is of positive polarity, and of a magnitude lying between the levels $i$=50.0 units and $i$=110.0 units.

The (1) output leads of flip-flops FF0, FF1, FF2 and FF3 are respectively connected to the AND gates 40, 41, 42 and 43. The timing signals $t_1$, $t_2$, $t_3$ and $t_4$ are respectively delivered to these AND gates for the purpose of sampling the state of each flip-flop. Thus, the state of flip-flop FF0 is sampled during the timing pulse period $t_1$ and if the same is set to its "1" state an energizing signal will be delivered by the AND gate 40 to the regenerative repeater via OR gate 46. The flip-flops are sampled in succession, as indicated in FIG. 5, and after regeneration the samples are transmitted in digital form to the remote decoded and utilization circuit. The invention, however, is in no way limited to the manner in which the PCM data is derived from the encoder. As is known to those skilled in the art, the PCM data could just as readily have been derived from the output of the comparison circuit 13. Such a derivation is quite commonly employed.

Following the sampling of the states of the flip-flops the same are reset by the reset timing signal $\varphi_R$, and a new sample is taken as indicated in FIG. 5. The above-described operation is thereafter repeated. The operation of the circuit is believed straight-forward and therefore a further example of said operation is not believed warranted. One can readily assume another sample of different magnitude and run through the operation step by step in the same fashion as set forth above.

The decision making operation for a message sample of negative polarity is in essence the same as that set forth above. The only essential difference is that the flip-flop FF0 is now set to its "1" state and this serves to actuate the negative polarity switch PS′. The making of decisions on the negative side is a "reflected" image of the positive side. The resistance branches R′/1 through R′/60, utilized with incoming message samples of negative polarity, will in general have resistance values that correspond to the resistance values used in the positive input sample decision making. Thus, the compression scales for the positive and negative halves of the input message current will be similar. It will be clear, however, that since the selection of the resistance values completely determines the compression scale, the positive and negative halves of the message signal could, if desired, be subjected to different compression scales. That is, the resistance values on the negative side can be different from those of the positive side.

In the above described encoder arrangement, the selected resistance values were such that in some instances the current through several branches combined to provide the desired reference current amplitude. However, it is within the scope of the invention to select resistance values that correspond exactly to the levels desired. Thus, the above described compression scale can be achieved by using resistance values of R/1, R/4, R/7, R/8, R/10, R/20, R/50, and R/110 for the respective branches, and this would entail only minor changes in the interconnections between the bank of associated AND gates to the flip-flop rail leads.

The differential PCM encoder shown in FIG. 4 of the drawings, includes the functions of integration and subtraction in addition to that of the feedback encoding arrangement of FIGS. 1 and 2. With one exception, the operation of the feedback encoder of FIG. 5 is the same as that set forth heretofore. The exception is that only a single bank of resistance branches and associated switching means is utilized herein and the positive and negative constant voltage supplies are both connected to this bank via the switch 61. In this way, the need for a duplicate set of gates, switches and resistances for both positive and negative values of message signal current is avoided with the concomitant saving of half of the gating and resistance reference network circuits. As will be recalled, the flip-flop FF0 is set to its "1" state in response to a negative input sample. The (1) output lead of this flip-flop is therefore energized and this serves to switch the switch 61 to the negative voltage source $-E_R$. In all other respects this feedback encoder operates in the same manner as that heretofore described.

The general operation of differential systems is well known to those in the art (see, for example, the patent to Cutler, 2,605,361, issued July 29, 1952) and hence the same will only be briefly described herein. The input message signal current is applied to terminal 71 and thence to the subtractor 72, where it is differentially combined with the output of the integrator 73. The output of the subtractor is applied to the sample and hold circuit 12 and thence to the feedback encoder heretofore described which resolves the analog sample to the nearest decision level. Upon completion of this resolution a quantized signal is transmitted to the integrator 73, in a manner to be described hereinafter, and the output of the latter is then fed back to the subtractor 72. Thus, the output of subtractor 72 comprises the difference between the input message signal and the quantized integrated output of integrator 73. The PCM output represents the quantized difference between the instant value of the input message signal and the signal derived by integration of the previously quantized samples.

The resistance network of the FIG. 4 encoder has been selected so as to achieve a logarithmic compression characteristic having quantized values of ±1, 2, 4, 8, 16, 32, 64 and 128. Now it has been appreciated for some time that a substantially improved signal-to-quantizing-noise ratio can be realized if the values of the decision levels appear intermediate the quantization levels; see the article by B. Smith entitled "Instantaneous Companding of Quantized Signals," Bell System Technical Journal, Vol. 36, 1957, page 653. This "offsetting" of the decision levels with respect to the quantized values can be accomplished in a linear differential arrangement, albeit with some inherent instability, by suitably applying a given bias to the feedback path. However, for a nonlinear system wherein the quantized steps are of successively increasing value the problem becomes exceedingly difficult. In fact, there has been no suggestion in the prior art as to how this "offsetting" might be accomplished in the prior art nonlinear encoding arrangements.

The feedback encoder of the present invention is uniquely suited to the above-noted "offsetting" feature. If the resistance values of the respective resistance branches are of the designated values, the decision levels will be found to fall intermediate the above-enumerated quantized values. Thus, for example, the decision level reference current generated for the first message-reference comparison is 12.0 units, which falls intermediate the quantized values of 8 and 16. The second comparison reference current of 48.0 units lies intermediate the quantized values 32 and 64, and so on.

Prior to being applied to the integrator 73, the reference current output from the resistance network is multiplied by a constant factor $$\left(\times\frac{4}{3}\right)$$

so as to arrive at the correct quantized value for integration. If each of the reference current values is multiplied by this factor, the above-enumerated quantized values will be obtained. Thus, the PCM output represents the quantized difference between the instant value of the input message signal and the signal derived by integration of the previously quantized samples. However, improved signal-to-quantizing-noise is achieved since the decision levels lie intermediate the quantized levels.

Following the last comparison and yet prior to the next sample, the timing signal $\varphi_G$ is delivered to the gate 75 to actuate the same and thereby couple the reference current to the input of the amplifier 76. This amplifier serves to amplify the reference current by a constant 4/3 factor, for the purposes given heretofore. The amplified current is then delivered to the input of integrator 73.

Since the decision level and the corresponding quantized value are both derived from the same source or network, without the necessity of biasing arrangements and the like, increased stability is obtained. Any drift in the reference current, due, for example, to drift in the voltage source $E_R$, is automatically compensated for since the integrated input to the subtraction circuit 72 will track the drift in said reference current.

A further advantage achieved in accordance with the invention is that a decision level remains fixed with respect to its particular quantized value. This, as will be clear to those skilled in the art, is an important factor in feedback stability considerations in differential type PCM systems.

It is to be understood that the above-described arrangements are illustrative of the application of the principles of the present invention. Numerous other arrangements may be devised by those skilled in the art without departing from the spirit and scope of the invention.

What is claimed is:

1. An encoder for representing amplitude samples of message current by a code group of pulses according to a permutation code in which the code groups correspond to amplitudes expressed on a nonlinear compression scale of selected decision levels, comprising means for periodically deriving an analog sample of the message current, means for sequentially generating reference currents, means for sequentially comparing said reference currents with said analog sample, and means responsive to said sequential comparison process for generating a code group of pulses as an output of said encoder, said reference current generating means including switching means responsive to said sequential comparisons for controlling the level of reference current generated by said reference current generating means, and further including a plurality of resistance branches adapted to be connected to a constant voltage source by said switching means to provide said reference current, said resistance branches corresponding in number to the number of said selected decision levels and being weighted to provide said nonlinear compression.

2. An encoder for transforming amplitude samples of message current to a permutation code group of pulses in which the code groups correspond to amplitudes expressed on a multilevel nonlinear compression scale, comprising means for periodically deriving an analog sample of the message current, means for sequentially generating reference currents, means for sequentially comparing said reference currents with said analog sample, and means responsive to said sequential comparisons for generating a code group of pulses as an output of said encoder, said reference current generating means including a resistance network having a resistance branch for each level of said nonlinear compression scale, the resistance branches being connected in common to the input of said comparison means, and switching means selectively interconnecting the resistance branches to a constant voltage supply in response to said sequential comparisons, said resistance branches being weighted in value to provide, when interconnected to said supply, reference currents equal to each of said levels.

3. An encoder for transforming amplitude samples of message current to a permutation code group of pulses in which the code groups correspond to amplitudes expressed on a nonlinear compression scale of selected decision levels, comprising means for periodically deriving an analog sample of the message current, means for sequentially generating reference currents, means for sequentially comparing said reference currents with said analog sample, and means responsive to said sequential comparisons for generating a code group of pulses as an output of said encoder, said reference current generating means including a plurality of resistance branches equal in number to the number of different decision levels, said resistance branches being connected in common to the input of said comparison means, and switching means selectively interconnecting the resistance branches to a constant voltage supply in response to said sequential comparisons, said resistance branches being weighted in value to provide, when interconnected to said supply, reference currents equal to said decision levels.

4. An encoder as defined in claim 3 wherein the same resistance branches are used for both polarities of said analog sample, and said switching means includes means for interconnecting said resistance branches to a constant voltage supply of predetermined polarity in response to positive polarity input analog samples and to a constant voltage supply of polarity opposite that of the first-mentioned supply in response to negative polarity input analog samples.

5. In a differential pulse code modulation system, subtracting means supplied with message signal current for providing differential signal current; means coupled to the output of said subtracting means for periodically deriving an analog sample of the differential signal current; means for transforming the analog samples of the differential signal current to a permutation code group of pulses in which the code groups correspond to amplitudes expressed on a nonlinear compression scale of selected decision levels comprising means for sequentially generating reference currents, means for sequentially comparing said reference currents with an analog sample, and means responsive to said sequential comparisons for generating a code group of pulses as an output of said encoder, said reference current generating means including a plurality of resistance branches equal in number to the number of different decision levels, said resistance branches being connected in common to the input of said comparison means, and switching means selectively interconnecting the resistance branches to a constant voltage supply in response to said sequential comparisons, said resistance branches being weighted in value to provide, when interconnected to said supply, reference currents equal to said decision levels; integrating means; means coupling the reference current most closely approximating each analog sample to said integrating means; said integrating means serving to add algebraically the reference currents supplied thereto; and means for coupling the output of said integrating means to the subtracting means for providing the differential signal currents.

6. A system in accordance with claim 5 wherein the generated reference currents are logarithmically related to each other and said means for coupling reference current to the integrating means includes means for multiplying the reference current by a constant factor.

7. A system in accordance with claim 6 wherein said reference current is multiplied by a 4/3 factor.

8. In a differential pulse code modulation communication system, subtracting means supplied with message signal current for providing differential signal current; means coupled to the output of said subtracting means for periodically deriving an analog sample of the differential signal current; means for transforming the analog samples of the differential signal current to a permutation code group of pulses in which the code groups correspond to amplitudes expresed on a nonlinear compression scale of selected decision levels comprising means for sequentially generating reference currents, means for sequentially comparing said reference currents with an analog sample, and means responsive to said sequential comparisons for generating a code group of pulses as an output of said encoder; integrating means; means coupling the reference current most closely approximating each analog sample to said integrating means; said integrating means serving to add algebraically the reference currents supplied thereto; and means coupling the output of said integrating means to the subtracting means for providing the differential signal currents.

9. A system in accordance with claim 8 wherein the most closely approximating reference current that is coupled to the comparison means and the current delivered to the integrating means are related to each other by a constant factor.

10. A system in accordance with claim 8 wherein the generated reference currents are logarithmically related to each other and said means for coupling reference current to the integrating means includes means for multiplying the reference current by a constant factor.

11. A system in accordance with claim 10 wherein said reference current is multiplied by a 4/3 factor.

12. In a differential pulse code modulation communication system which includes an encoder for representing samples of a message signal by a code group of pulses and a decoder at a remote point for reconstructing a replica of the message signal from the code group of pulses transmitted, said encoder comprising subtracting means supplied with message signal current for providing differential signal current; means coupled to the output of said subtracting means for periodically deriving an analog sample of the differential signal current; means for transforming the analog samples of the differential signal current to a permutation code group of pulses in which the code groups correspond to amplitudes expressed on a nonlinear compression scale of selected decision levels comprising means for sequentially generating reference currents, means for sequentially comparing said reference currents with an analog sample, and means responsive to said sequential comparisons for generating a code group of pulses as an output of said encoder; integrating means; means coupling the reference current most closely approximating each analog sample to said integrating means; said integrating means serving to add algebraically the reference currents supplied thereto; and means coupling the output of said integrating means to the subtracting means for providing the differential signal currents.

References Cited by the Examiner

UNITED STATES PATENTS

| | | | |
|---|---|---|---|
| 2,592,308 | 4/52 | Meacham | 325—38 |
| 2,889,409 | 6/59 | Gabrey | 179—15.6 |
| 3,016,528 | 1/62 | Villars | 340—34 |
| 3,051,938 | 8/62 | Levy | 340—347 |

NEIL C. READ, *Primary Examiner.*

WILLIAM C. COOPER, *Examiner.*